United States Patent [19]

Klingelhoefer

[11] Patent Number: 5,199,998

[45] Date of Patent: Apr. 6, 1993

[54] STABILIZATION OF ACICULAR, FERROMAGNETIC METAL POWDERS ESSENTIALLY CONSISTING OF IRON

[75] Inventor: Paul Klingelhoefer, Mannheim, Fed. Rep. of Germany

[73] Assignee: BASF Aktiengesellschaft, Ludwigshafen, Fed. Rep. of Germany

[21] Appl. No.: 879,002

[22] Filed: May 6, 1992

[30] Foreign Application Priority Data

May 10, 1991 [DE] Fed. Rep. of Germany ....... 4115426

[51] Int. Cl.$^5$ ............................................... H01F 1/02
[52] U.S. Cl. .................................... 148/105; 148/287
[58] Field of Search ..................... 148/105, 286, 287

[56] References Cited

U.S. PATENT DOCUMENTS

| | | | |
|---|---|---|---|
| 3,967,986 | 7/1976 | Rau et al. | 148/105 |
| 4,420,330 | 12/1983 | JaKusch et al. | 148/105 |
| 4,960,462 | 10/1990 | Mueller et al. | 75/252 |

FOREIGN PATENT DOCUMENTS

| | | | |
|---|---|---|---|
| 2212934 | 9/1973 | Fed. Rep. of Germany. | |
| 48-25662 | 4/1973 | Japan | 148/105 |
| 1-309903 | 12/1989 | Japan | 148/105 |
| 7018910 | 7/1972 | Netherlands. | |
| 1265768 | 3/1972 | United Kingdom. | |

OTHER PUBLICATIONS

An Analytical Model of the Write Process in Digital Magnetic Recording, Williams et al. (AIP Conf. Proc. 5 (1971), 738–743.

*Primary Examiner*—John P. Sheehan
*Attorney, Agent, or Firm*—Herbert B. Keil

[57] ABSTRACT

Acicular, ferromagnetic metal powders essentially consisting of iron are stabilized against oxidation and corrosion by a two-stage reaction of the metal powder with an oxygen-containing inert gas, by a process in which this gas mixture has a water vapor content of from 70 to 95% relative humidity in the second stage and the oxygen content is from 10 to 20%.

1 Claim, No Drawings

STABILIZATION OF ACICULAR, FERROMAGNETIC METAL POWDERS ESSENTIALLY CONSISTING OF IRON

The present invention relates to a process for stabilizing acicular, ferromagnetic metal powders consisting essentially of iron against oxidation and corrosion by a two-stage reaction with an oxygen-containing inert gas.

The use of acicular ferromagnetic metal particles exhibiting single-domain behavior as magnetizable material for the production of magnetic recording media is known. The search for improved materials is based on the desire for higher and higher storage densities per unit area. This means that the particles are becoming smaller in volume and reaching a higher coercive force. For practical use, the fineness of the particles must be matched with the requirement for sufficient residual induction and good magnetic and chemical stability. With these requirements, the lower limit of the particle volume for metal particles having a high coercive force is $0.6 \cdot 10^{-17}$ cm$^3$. However, metal particles in this size range are known to be pyrophoric.

It is now known that pyrophoric metal powders can be stabilized by surrounding the metal particles with an oxide layer by controlled oxidation. This can be carried out at from 20 to 50° C. by passing over an inert gas which initially contains little oxygen and whose oxygen concentration is slowly increased in the course of the reaction (DE-A 20 28 536). A similar procedure is also adopted in the processes disclosed in DE-A 22 12 934 and DE-A 23 61 539. However, these processes have disadvantages in that, owing to the high enthalpy of reaction during the formation of the iron oxide coating, the reaction temperature on the one hand and also the oxygen content of the gas on the other hand have to be very low to enable the resulting heat of reaction to be removed by corresponding heat transport processes. Consequently, stabilization processes carried out in this manner are generally very time-consuming. Furthermore, the protective oxide layers are not sufficiently pure. Although relatively short stabilization times can be achieved at elevated temperatures just below the self-ignition temperature, control of the reaction is then extremely critical and the results are difficult to reproduce. It has therefore also been proposed to carry out the passivation step in two stages. NL-A 7 018 910 discloses a process for passivating pyrophoric ferromagnetic metal powders with an oxygen-containing inert gas, in which, in a first passivation stage, the temperature does not exceed 30° C. above the starting temperature and, in a second passivation stage, the minimum permitted temperature is 50° C. and the maximum 150° C. The reaction temperature is controlled by metering of oxygen. However, the disadvantage of such a process is the poor control and reproducibility of such a reaction at temperatures at about or above 70° C.

It is an object of the present invention to provide an improved process for stabilizing acicular ferromagnetic metal powders essentially consisting of iron, which process results in excellent stability to oxidation and corrosion resistance of the metal particles.

We have found that this object is achieved by a two-stage reaction of the acicular, ferromagnetic metal powder consisting essentially of iron with an oxygen-containing inert gas, the oxygen content of the inert gas being no more than 2% by volume in the first stage, if an oxygen/inert gas mixture having a water vapor content of from 70 to 95% relative humidity and an oxygen content of from 10 to 20% is used in the second stage.

To carry out the novel process, the finely divided pyrophoric ferromagnetic and acicular metal particles prepared in a known manner and essentially consisting of iron are exposed to an oxygen-containing inert gas stream, in general an air/nitrogen stream. This can be effected by passing the gas stream over the material in a rotary tubular oven or by carrying out the process in conventional fluidized-bed ovens using an air/inert gas mixture as the fluidizing gas. The duration of this first treatment stage is from 90 to 240, preferably 120, minutes.

In the subsequent second stage of the stabilization process, water vapor in an amount corresponding to a relative humidity of from 70 to 95% is mixed with the oxygen/inert gas mixture. The oxygen content is in particular from 10 to 20% by volume.

It is essential for the novel process that the two stages of the stabilization process are carried out directly one after the other. Otherwise, the particles obtained in the first treatment stage may regain their pyrophoric character.

The novel process can be carried out particularly advantageously in the case of the acicular, ferromagnetic metal powders which essentially consist of iron and contain less than 0.4% by weight of nickel. Such ferromagnetic metal particles having a high coercive force and magnetization have already been described (DE-A 37 43 039). If these known metal powders are subjected to the novel stabilization process, it is possible to obtain particularly advantageous ferromagnetic materials which have in particular a coercive force of more than 120 kA/m and a saturation magnetization loss, due to the stabilization process, in a humid warm atmosphere (65° C, 90% relative humidity, test duration 7 days) of less than 15%. These ferromagnetic metal particles also have a water content of less than 1% and a nickel content of less than 0.4% by weight.

The novel process permits effective stabilization of the finely divided ferromagnetic metal particles. As a result of the novel process, the metal particles are surrounded by a particularly pure, uniform and dense oxide coating. This manifests itself in a narrow switching field distribution, which is retained in particular after the storage test described has been carried out.

Such stabilized metal particles are therefore very useful for the production of metal recording media since these can be processed without special precautions.

The Examples which follow illustrate the invention. The coercive force $H_c$ [kA/m] at a mean tap density of $\rho = 0.7$ g/cm$^3$ and the specific remanence $M_r/\rho$ and the specific saturation $M_m/\rho$ in [nTm$^3$/g] were determined for the resulting materials using a vibrating sample magnetometer in a magnetic field of 400 kA/m. Furthermore, the switching field distribution SFD was measured according to Williams and Comstock (AIP Conf. Proc. 5 (1971), 738). The stability of the materials was tested by subjecting them to an environmental test (65° C., 95% relative humidity) for one week and determining the percentage loss or stating the SFD$^I$.

EXAMPLE 1

Preparation of nickel-free $\alpha$-Fe$_2$O$_3$ intermediate according to DE-A 37 43 039

In a thermostatable stirred vessel equipped with a stirrer, a gassing apparatus and a reflux condenser, 1223 g of $FeSO_4 \times 7H_2O$ were dissolved in demineralized water and made up to a volume of 6 l; 5.79 g of a 95% strength pyrophosphoric acid were added to the solution. The solution was thermostated at 40° C., after which some of the $Fe^{2+}$ ions were precipitated as the hydroxide by adding 1226 ml of a 14.8% strength NaOH. The precipitate was oxidized by passing in air, while maintaining the temperature. After the pH of the suspension had fallen below pH 4, the $\alpha$-FeOOH crystallites formed in the first stage were caused to increase in size by means of a growth process. Crystal growth occurred at 70° C. and at a pH of 5.2, which was kept at this value by continuously metering in a 14.8% strength NaOH to which 35 g of a 26% strength waterglass solution had been added. After the oxidation reaction was complete, the shape-stabilizing treatment of the pigment was completed by adding a further 27 g of 26% strength waterglass solution and bringing the pH to 5.2.

The $\alpha$-FeOOH pigment prepared in this manner was filtered off from the mother liquor, washed sulfate-free and dried. It was then dehydrated and heated at 800° C. under a nitrogen atmosphere for 90 minutes. The resulting $\alpha$-$Fe_2O_3$ pigment served as a starting material for the experiments described below.

EXAMPLE 2

10 g of the $\alpha$-$Fe_2O_3$ material prepared in Example 1 were reduced together with hydrogen in the course of 6 hours at 450° C. After cooling to room temperature under a nitrogen atmosphere, the pigment was passivated by passing over a nitrogen/air mixture containing 1.25% by volume of oxygen for 90 minutes and immediately thereafter was finally stabilized by treatment under air at 95% relative humidity at 65° C. for 24 hours. The experiment was repeated; the data for the powders thus obtained are shown in the Table.

COMPARATIVE EXPERIMENT 1

The procedure was as described in Example 2, except that the stabilization treatment with air at 95% relative humidity was omitted. The data for the resulting powder are likewise contained in the Table.

COMPARATIVE EXPERIMENT 2

The procedure was as described in Example 2, except that the stabilization stage was carried out at 65° C. and in dry air instead of at 65° C. and at 95% relative humidity. The powder obtained consisted of completely oxidized $\gamma$-$Fe_2O_3$.

COMPARATIVE EXPERIMENT 3

Instead of being carried out by the process from Example 2, passivation was effected as follows: In a first stage, the pigment was treated for 2 hours at 65° C. in a nitrogen atmosphere at 95% relative humidity and then, in a second stage, with an air/nitrogen mixture containing 4.2% by volume of oxygen and likewise having a relative humidity of 95%. The data for the powder obtained are shown in the Table.

COMPARATIVE EXPERIMENT 4

The procedure was as described in Example 2, except that, for passivation, water vapor was mixed with the atmosphere used in the first process stage by passing the gas, before entry into the rotary tubular oven, through a water bath at room temperature. The second process stage was replaced by subsequent heating of the passivated material at 300° C. for 1 hour under nitrogen. The pigment had the powder data shown in the Table. After storage at room temperature for 1 week, spontaneous complete oxidation to $\gamma$-$Fe_2O_3$ occurred.

COMPARATIVE EXPERIMENT 5

The procedure was as described in Example 2, except that the gas mixture used for passivation in the first process stage contained 4.2% by volume of oxygen. The second process stage was dispensed with. The powder data are contained in the Table.

TABLE

| | Magnetic properties before | | | | after environmental test | | |
|---|---|---|---|---|---|---|---|
| | $H_c$ | $M_m/\rho$ | $M_r/\rho$ | SFD | $\Delta M_m/\rho\%$ | $\Delta H_c\%$ | SFD* |
| Example 2 | 123.3 | 113.3 | 61.1 | 0.62 | −10.5 | −3.5 | 0.68 |
| Comparative Experiment 1 | 122.1 | 136.4 | 73.8 | 0.64 | completely oxidized after environmental test | | |
| Comparative Experiment 2 | The pigment was completely oxidized to $\gamma$-$Fe_2O_3$ | | | | | | |
| Comparative Experiment 3 | 122.2 | 127.8 | 66.6 | 0.65 | −16.7 | −6.1 | 0.74 |
| Comparative Experiment 4 | 119.1 | 145.9 | 77.9 | 0.64 | −47.2 | −49.5 | — |
| Comparative Experiment 5 | 106.1 | 128.4 | 65.3 | 0.78 | −6.0 | −0.5 | 0.80 |

I claim:

1. A process for stabilizing acicular, ferromagnetic metal powders consisting essentially of iron against oxidation and corrosion by a two-stage reaction of the metal powder with an oxygen-containing inert gas, with the proviso that the oxygen content of the inert gas is not more than 2% by volume in the first stage, wherein an oxygen/inert gas mixture having a water vapor content of from 70 to 95% relative humidity and an oxygen content of from 10 to 20% by volume is used in the second stage.

* * * * *